Aug. 5, 1969 W. WALDBAUER 3,459,105
METHOD AND APPARATUS FOR PRODUCING GLUED FOLDED BOXES
Filed June 26, 1967 9 Sheets-Sheet 1

Inventor:
WILHELM WALDBAUER
BY Howson & Howson
ATTYS.

Inventor:
WILHELM WALDBAUER

Inventor:
WILHELM WALDBAUER
BY Howson & Howson
ATTYS.

Inventor:
WILHELM WALDBAUER
BY
*Howdon & Howdon*
ATTYS.

United States Patent Office 3,459,105
Patented Aug. 5, 1969

3,459,105
METHOD AND APPARATUS FOR PRODUCING
GLUED FOLDED BOXES
Wilhelm Waldbauer, Stuttgart-Lederberg, Germany, assignor to Fit Container A.G., a corporation of Switzerland
Filed June 26, 1967, Ser. No. 648,841
Claims priority, application Switzerland, July 20, 1966, 10,538/66; Apr. 27, 1967, 5,999/67
Int. Cl. B31b 1/44, 1/62; B05c 3/00
U.S. Cl. 93—51                                   16 Claims

ABSTRACT OF THE DISCLOSURE

A method and an apparatus for forming the bottom part or cover part of a folded box by means of a plunger which presses a precut blank, the edge portions of which are coated with a liquid adhesive, into a female mold, and wherein means are provided for preventing the marginal strips of the blank which are coated with adhesive from coming in contact with the plunger when the blank is being pressed into and retracted from the mold.

---

The present invention relates to a method and an apparatus for producing the bottom part or the cover part of a folded box from a flat precut blank which are distinguished from the methods and apparatus as were previously employed for this purpose by the fact that the adhesive is applied upon the blank immediately prior to the operation of molding it to form the box.

Assuming that the upwardly open bottom part of a folded box is to be produced in accordance with the invention, this box part comprises a bottom, four side walls, two pairs of wall portions or flaps adjoining the vertical edges at both ends of two opposite side walls and bent at right angles thereto so as to extend toward each other into the plane of the two other side walls and thereby reinforce the latter, and a marginal strip which adjoins the upper edge of each of these other side walls and is folded inwardly over the upper edges of the adjacent pair of flaps which are bent toward each other so as to overlap these upper edges. In order to increase the solidity of the box and also to improve its appearance, it is possible according to the invention also to provide each of the two side walls carrying the two pairs of flaps with an upper marginal strip which is likewise folded inwardly and glued to the respective side wall.

Background of the invention

The methods and apparatus for producing such folded boxes prior to the invention were usually designed to apply a tack-dry adhesive upon those parts of a blank which when the box is erected are to be applied upon and glued to each other. It has, however, been found especially after such blanks which are coated with a dry adhesive have been kept on storage for a greater length of time, that the coated parts will no longer properly adhere so as to attain a permanent connection to the uncoated parts, and that it involves considerable difficulties or requires special treatments to keep such coated blanks on storage and also to use them for producing the desired folded and properly glued boxes.

Summary of the invention

It is an object of the present invention to provide a method and an apparatus which eliminates the above-mentioned disadvantages by applying a liquid adhesive upon the parts of the blank which are to be glued immediately prior to the time when a pressure is applied upon these parts so as to adhere and in such a manner that the liquid adhesive will neither interfere with the operation of molding the box nor will be smeared upon any parts of the apparatus which should be kept clean.

For this purpose, the invention provides that the blank which is to be used for producing a box of the type as described is cut so that two opposite sides thereof which, when the blank is subsequently folded, form two opposite side walls and preferably the end walls of a box, are provided with marginal edge portions or strips which are coated with a liquid adhesive before the blank is molded into the desired box shape by means of a plunger which presses the blank into a female mold. The invention further provides that, when the plunger presses the blank against and into the female mold, these coated marginal strips are bent outwardly by means of deflectors which project laterally over the plunger, and that after the plunger has been retracted, these coated strips are folded over and glued upon the inwardly bent end portions of the two opposite side walls by means of arms which are pivotally mounted on the plunger.

Another feature of the invention consists in further reinforcing and solidifying such a folding box by also coating the mentioned side walls which preferably form the end walls of the box with adhesive, and by holding these walls back from the inwardly pivoted end portions of the two other side walls by means of elements which are connected to the plunger while the blank is being pressed into the female mold.

The liquid adhesive is preferably applied upon the respective parts of the blank by means of nozzles which are mounted in a fixed position on the frame of the apparatus and along which the blank is passed while being transferred from the stacking device to the female mold.

For carrying out the new method, the invention further provides an apparatus which essentially consists of a plunger and a female mold with a folding recess therein which are operatively associated with each other, of retaining rods at opposite sides of and indirectly connected to the plunger which are movable to a limited extent in the direction of movement of the plunger and are adapted to act upon the end wall parts of the blank, and of a pair of deflecting members which are provided on the rear part of the plunger and project laterally over the same. The retaining rods are provided according to the invention for insuring that at first the end portions or flaps of the two side walls which usually form the longitudinal sides of a box, will be applied upon the plunger and that only thereafter the end walls will be applied. The deflecting members, on the other hand, are provided for folding the adhesive-coated marginal strips outwardly so as to insure that these strips will not come in contact with the plunger while the latter is being retracted.

Another feature of the invention consists in providing the two lateral front edges of the folding frame with pivotable arms which are adapted to fold the marginal strips of the end walls over the inwardly bent end portions or flaps as soon as the plunger has been retracted to its rear end position.

A further feature of the invention consists in the provision of a gripping element which is movable in a direction at a right angle to the pressing direction of the plunger and is provided with a slot into which an edge portion of the blank may be inserted, and with a lever which is adapted to clamp the inserted edge portion. The invention further provides an abutment for pivoting this lever out of its clamping position when the plunger is moved to the proper position for carrying out the molding operation.

Such a gripping element is adapted to clamp a blank in a fixed position merely by the insertion of its edge portion into the slot in the gripping element, that is, without requiring a special control element or other device.

Another feature of the invention consists in providing the clamping lever of the gripping element in the form of a two-armed lever which has one arm which is adapted to clamp the edge portion of the blank against one side wall of the slot and a second arm upon which a force may be exerted to pivot the clamping lever so as to release the blank. This force may be exerted upon the clamping lever by an intermediate two-armed lever one arm of which engages upon the second arm of the clamping lever, while its other arm is adapted to engage upon and be pivoted by the mentioned abutment. This abutment is provided according to the invention in the form of a curved cam surface along which a roller which is mounted on the second arm of the intermediate lever is adapted to slide so as to effect a smooth operation of the two levers rather than hard impacts between them and the abutment.

Another feature of the invention consists in the provision of a plurality of nozzles from which the adhesive is extended in a substantially horizontal direction and which are mounted at such a level that during the movement of the gripping element with the blank thereon the adhesive is applied upon the respective parts of the blank in the form of worms of a length which is nearly equal to the width of the blank.

In order to insure that the adhesive will freely emerge from the nozzles and will also be applied upon the blank in the form of worms rather than as thin wide strips which might result in a premature setting of the adhesive, the outlet openings of the nozzles are spaced at a short distance from the surfaces of the blank which are to be coated.

For the purpose of controlling the length of time during which the adhesive emerges from the nozzles, the mouth of each nozzle is covered by a diaphragm which is provided with an outlet aperture and is slidable or pivotable relative to the body of the nozzle by a central control gear in accordance with the movements of the gripping and other elements of the apparatus.

A further feature of the invention consists in the provision of a device for holding a stack of precut blanks in a position above the female mold, and of a pneumatically operated feeding device which is provided with suction cups for picking up and withdrawing the first of these blanks from the stack and for feeding it to the position where it will then be gripped by the gripping element for the next molding operation. This feeding device preferably carries pressure members which are adapted to act upon the parts of the blank which project laterally over the edge portions of the part which subsequently forms the bottom of the box. The effect of these pressure members is to bend these laterally projecting parts in a staggered relation toward the rear of the plane of the main parts of the blanks so that each front blank may be easily withdrawn from the stack without interfering with the subsequent blanks. The front ends of these pressure members which act upon the respective front blank are preferably provided with rollers.

Still another feature of the invention consists in providing the opposite sides of the plunger with deflecting members of a triangular cross section which, when the plunger is in its forward position within the female mold and the blank therein will press the marginal strips of this blank as previously described against a flat surface of a shaft which is preferably provided with needles and on which shaft an L-shaped arm is secured. This construction prevents the plunger when being retracted from the mold from coming in contact with the adhesive on the marginal strips of the blank which may be either on the longitudinal walls or on the end walls of the box to be formed. Of course, the deflecting means may also be of any other suitable construction and may consist, for example, of fingers which are located at the outside of the folding mold and are adapted to engage behind the respective marginal strips and to bend them slightly in the outward direction before the plunger is being retracted from the mold.

The features and advantages of the present invention will become more clearly apparent from the following detailed description thereof which is to be read with reference to the accompanying diagrammatic drawings, in which.

Figure 1:
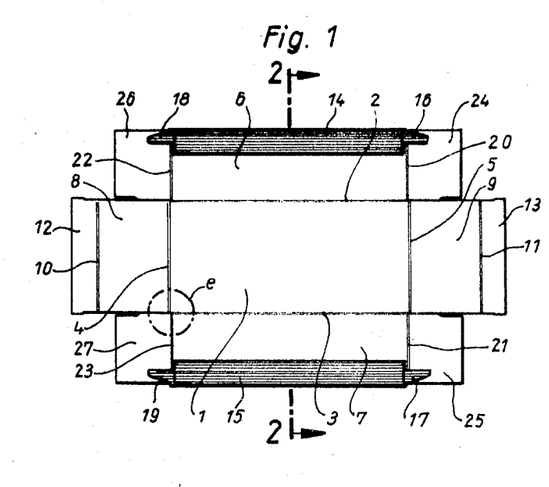
FIGURE 1 shows a top view of a blank of a folded box to be made according to the invention.
Figure 2:
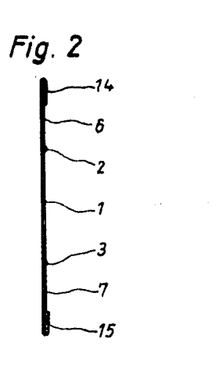
FIGURE 2 shows a cross section which is taken along the line II–II of FIGURE 1.
Figure 3:
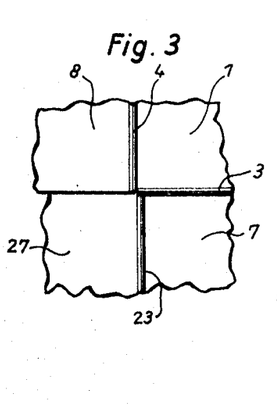
FIGURE 3 shows an enlarged view of a part of the blank as shown in FIGURE 1.
Figure 4:
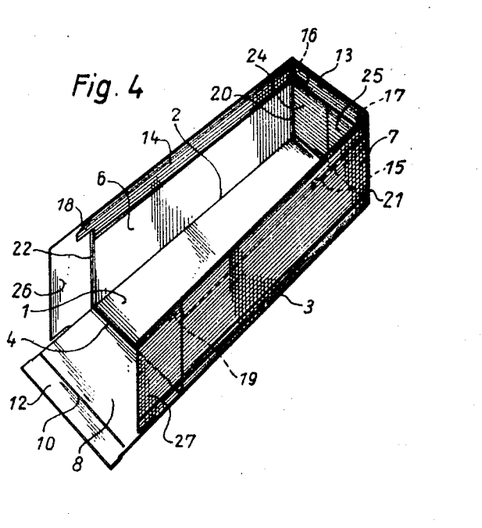
FIGURE 4 shows a perspective view of a folded box which is still open at one end.

Referring first to FIGURES 1 to 4 of the drawings, the blank for producing a glued folded box according to the invention has a bottom part 1 which is defined by the folding lines 2 to 5 which separate the bottom part from the adjoining side wall parts 6 and 7 and the end wall parts 8 and 9. The upper edges of these end wall parts 8 and 9 are formed by folding the marginal strips 12 and 13 over the folding lines 10 and 11. The blank may also be provided in the same manner with folded edges along the side wall parts 6 and 7 by folding over the marginal strips 14 and 15. These marginal strips are provided with reinforcing tongues 16 to 19 which when the box is erected are operatively associated with the marginal strips 12 and 13. The side wall parts 6 and 7 which are laterally defined by the folding lines 20 to 23 are adjoined by lateral end parts 24 to 27. As illustrated in FIGURE 3, the folding line 23 and accordingly also the folding lines 20 to 22 are inwardly offset relative to the folding lines 4 and 5 so as to permit a proper folding of the box.

Figure 5:
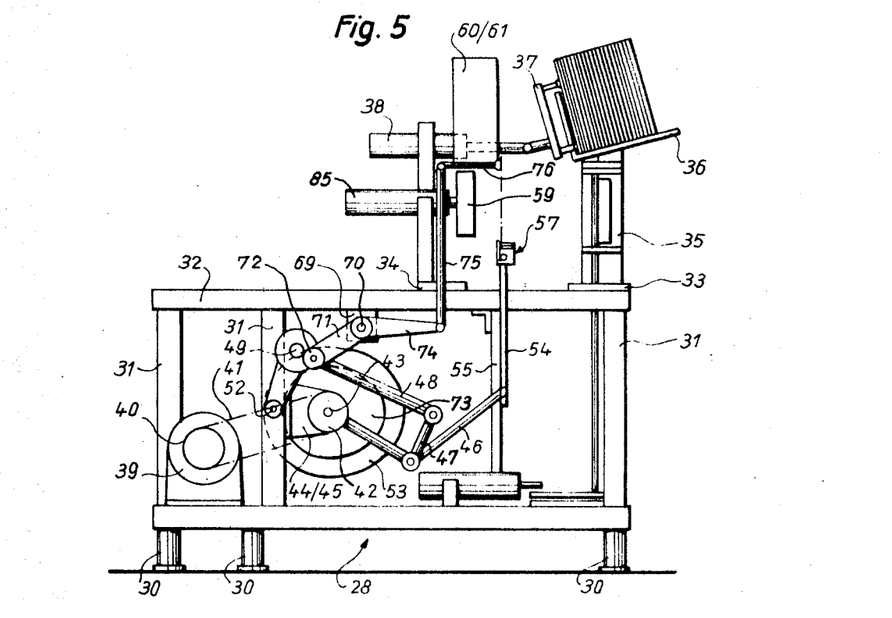
FIGURE 5 shows a side view of an apparatus according to the invention.
Figure 6:
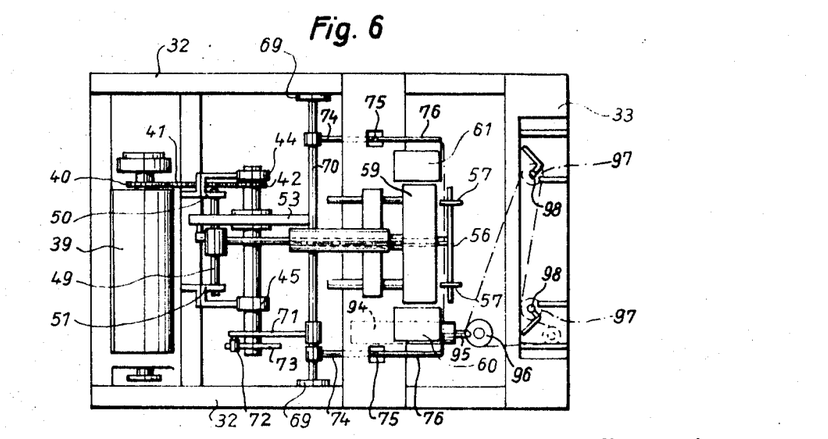
FIGURE 6 shows a top view of the apparatus according to FIGURE 5 without the stacking device and the feed element.

The individual parts of the apparatus as shown in FIGURES 5 and 6 for producing the folded boxes according to the invention are mounted on a frame 28 which is supported on feet 30 and provided with vertical posts 31 and horizontal bars 32 on which plates 33 and 34 are mounted. Plate 33 carries a female mold 35 and above the latter a stacking device 36. A feeding member 37 which is equipped with suction cups and secured to the piston of a compressed-air cylinder 38 and connected to a vacuum line is adapted to carry out reciprocating movements in which it picks up one front blank at a time from the stacking device and moves it to a position in which it will be taken up by gripping elements 57.

The shaft of motor 39 carries a sprocket wheel 40 with a chain 41 thereon for driving another sprocket wheel 42 which is secured to a shaft 43 which is rotatably mounted in bearings 44 and 45. Shaft 43 carries a main lever 46 which is connected by a rocker arm 47 to one arm of an angular lever 48. This lever 48 is mounted on a shaft 49 which, in turn, is mounted in bearings 50 and 51. The other arm of lever 48 carries a roller 42 which runs along a cam groove in a cam member 53 and thereby gives the angular lever 48 an oscillating motion which is transmitted by the rocker 47 to the main lever 46.

The main lever 46 is pivotally connected to one or a pair of connecting rods 54 which are slidable upwardly and downwardly along a guide member 55 which is rigidly secured to the frame 28. The connecting rods 54 carry a transverse rod 56 on which a pair of gripping elements 57 are mounted.

When these gripping elements 57 are in their uppermost position, they grip a blank and move it between the plunger 59 and the female mold 35. During this movement, adhesive is also applied upon the marginal strips 12 and 13 and possibly also upon the end wall parts 8 and 9.

Figure 8:
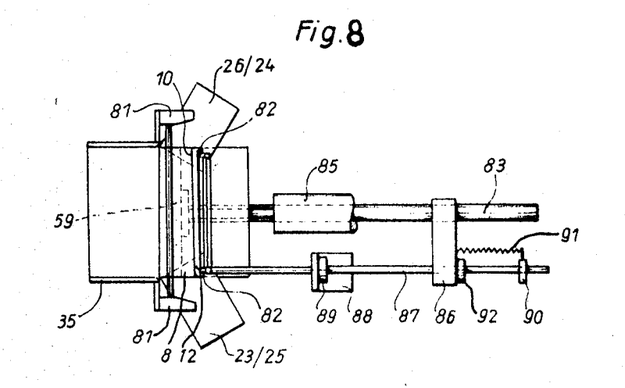
FIGURE 8 shows a side view of the folding tools in an intermediate position.
Figure 9:
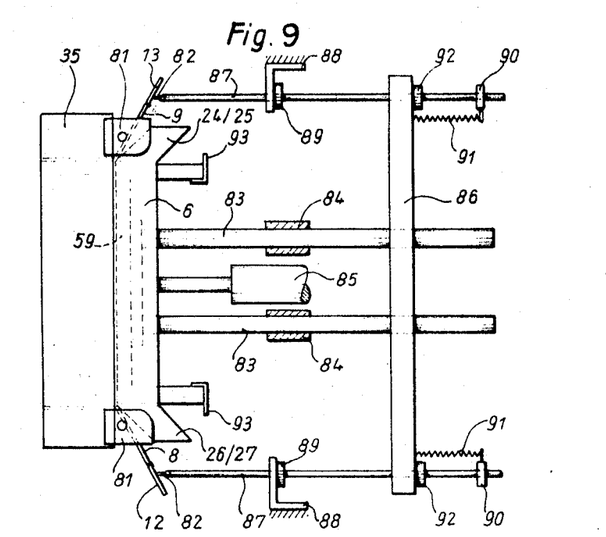
FIGURE 9 shows a top view of the folding tools in the same position as shown in FIGURE 8.

After the gripping elements 57 have released the blank, it rests on rails, not shown, and is laterally guided by suitable means, likewise not shown. When the blank is in this position in which it is fixed both in the horizontal and vertical directions, it will be pressed by plunger 59 aganst the mold 35 on which folding arms 81 are provided, as illustrated in FIGURES 7 to 10. These folding arms are located in such positions and are made of such a shape that the end parts 24 to 27 of the box will at first be bent about the folding lines 20 to 23. The plunger 59 then presses the blank into the folding recess of mold 35. It is at this time necessary to insure that the side walls 6 and 7 will be erected prior to the end wall parts 8 and 9. For this purpose, a pair of rods 87 are provided, the front ends of which form retaining pins 82 which are moved forwardly together with the plunger 59. Plunger 59 is mounted on a pair of guide rods 83 which are slidable in bearings 84, and it is connected to a piston of a compressed-air cylinder 85 which is connected by means of mechanically actuated valves to a compressed-air line or to a vacuum line. Guide rods 83 are connected to each other by a crossbar 86 the ends of which are provided with bores in which the rods 87 are slidable. Near their front ends, rods 87 are guided in bores in angle irons 88. Rods 87 carrying setting or stop-rings 89, 90, and 92. The rear setting rings 90 are connected to crossbar 86 by tension springs 91 which, when the die 59 and crossbar 86 are moving forwardly also cause the rods 87 to be moved forwardly until the stops rings 89 abut against the angle irons 88, as illustrated in FIGURES 8 and 9. Therefore, when plunger 59 moves forwardly, the end wall parts 8 and 9 will be held back relative to the side wall parts 6 and 7, and when the plunger reaches its most forward position, these end wall parts 8 and 9 will be completely erected, while the adjoining marginal strips 12 and 13 wil be bent outwardly by the deflectors 93 and be pressed against the pivots 99 of flaplike arms 100. This has the result that, when plunger 59 moves rearwardly, it will not come in contact with the worms of adhesive which are applied upon the marginal strips 12 and 13. When the plunger is again in its rear end position, arms 100 will be pivoted inwardly, as shown in FIGURE 11, and the marginal strips 12 and 13 thereby will be glued upon the end wall parts or flaps 24 to 27.

Figure 11:
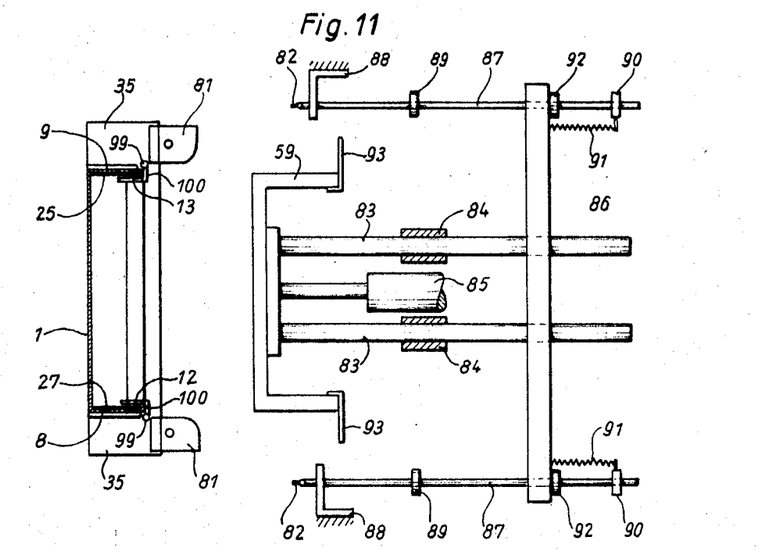
FIGURE 11 shows a top view of the folding tools when the plunger is in the retracted position.
Figure 12:
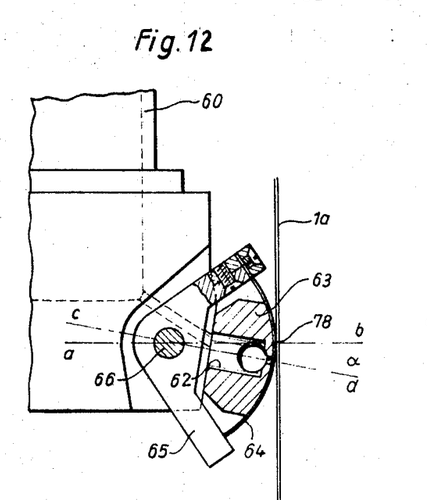
FIGURE 12 shows a vertical section of an adhesive applicating nozzle.

The operation of these arms 100 is controlled by the piston 95 of a compressed-air cylinder 94, a sprocket wheel 96, and two further sprocket wheels 97 which are keyed on shafts 98 which also form the pivots 99 of the arms 100. Above the guide member 55 two adhesive containers 60 and 61 are provided in which the adhesive may be heated to the desired temperature. These containers are closed air-tight and their lower ends are provided with nozzles 63 which communicate through bores 62 with the containers. The front surface of each of these nozzles 63 has a cylindrical curvature upon which the corresponding inner cylindrical surface of a diaphragm 64 engages which is mounted on an angular member 65 which is pivotable about the axis of a shaft 66. Diaphragm 64 is provided with an outlet opening 67 from which the adhesive emerges when the diaphragm is pivoted to its opening position.

Figure 13:
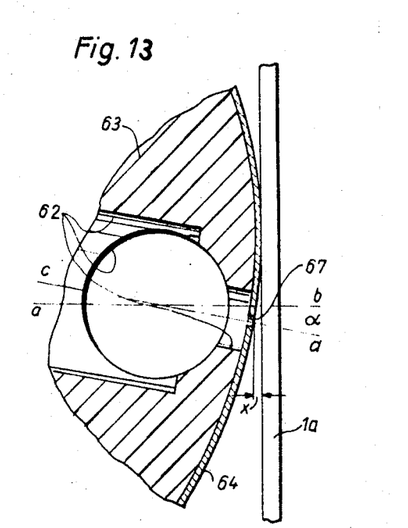
FIGURE 13 shows an enlarged view of a part of FIGURE 12.

The horizontal bars 32 of frame 28 are provided with bearings 69 in which a shaft 70 is mounted to which one end of a lever 71 is secured, the other end of which carries a roller 72 which is adapted to move along a cam member 73 which is mounted on shaft 43. Due to the rotation of this cam member 73 with shaft 43, lever 71 will carry out a pivoting movement and thereby turn the shaft 70 for a distance in accordance with that of the pivoting movement of lever 71. Shaft 70 also has a pair of levers 74 secured thereto which are therefore likewise pivoted in accordance with the rotation of shaft 70. The pivoting movement of lever 74 will be transmitted by a connecting rod 75 to a lever 76 which is secured to shaft 66 and thus controls the operation of diaphragm 64. Since the axis of the bore 62 is inclined at an angle $\alpha$ relative to the horizontal plane, the outlet opening of the nozzle is located below the point of engagement of the blank 1a with diaphragm 64 which may be effected by guide or pressure rollers, not shown. Consequently, the adhesive will not be prevented from emerging from nozzle 63 and may be applied upon the blank in the form of a worm.

Figure 7:
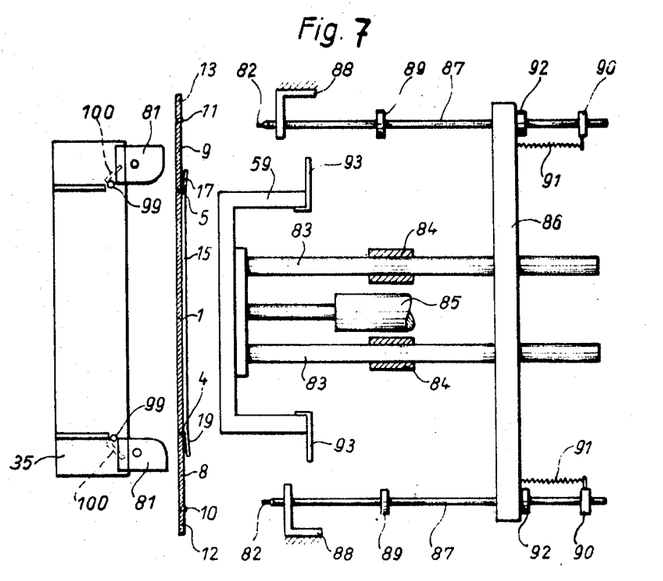
FIGURE 7 shows a top view of the folding tools in the rear end position of the plunger.
Figure 10:
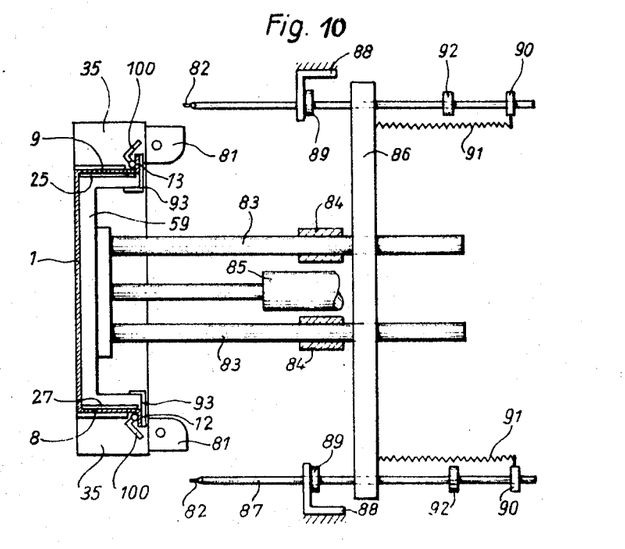
FIGURE 10 shows a top view of the folding tools in the forward end position of the plunger.
Figure 14:
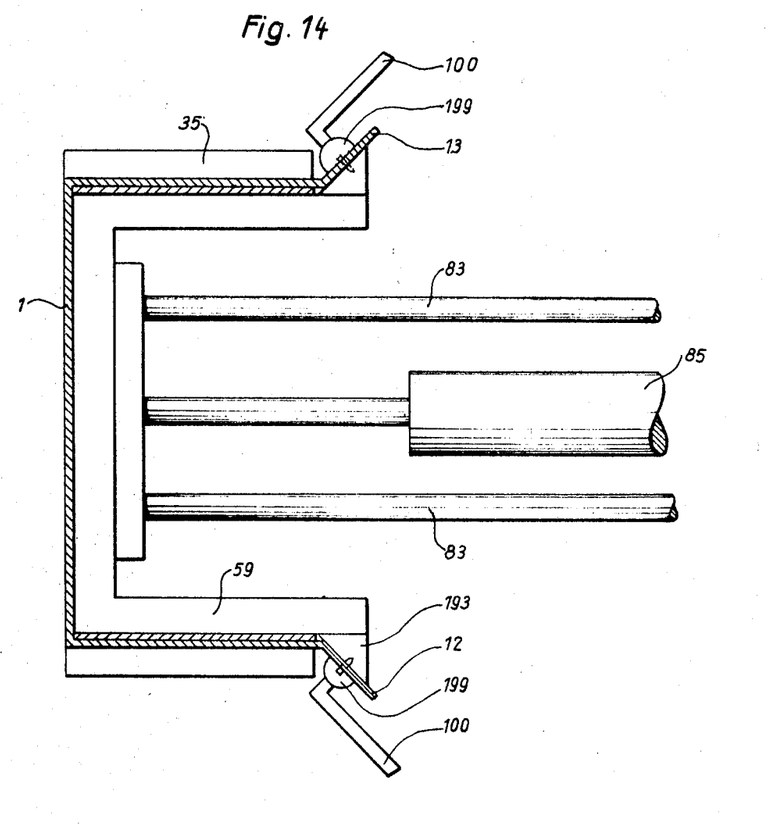
FIGURE 14 shows a top view of the folding tools according to a modification of the invention.

According to the modified embodiment of the invention as illustrated in FIGURE 14, the plunger 59 is not provided with angular deflectors 93 as shown in FIGURES 7, 9 and 10 but with deflectors 193 of a triangular cross section which when the die is in its forward position cooperate with the shafts 199 of the flaplike arms 100. These shafts have a semicircular cross section and their flat surfaces are studded with gripping needles against which the marginal strips 12 and 13 of blank 1 will then be pressed. When arms 100 are then pivoted, the marginal strips 12 and 13 will be withdrawn from the needles and be pivoted inwardly, as shown in FIGURE 11.

Figure 15:
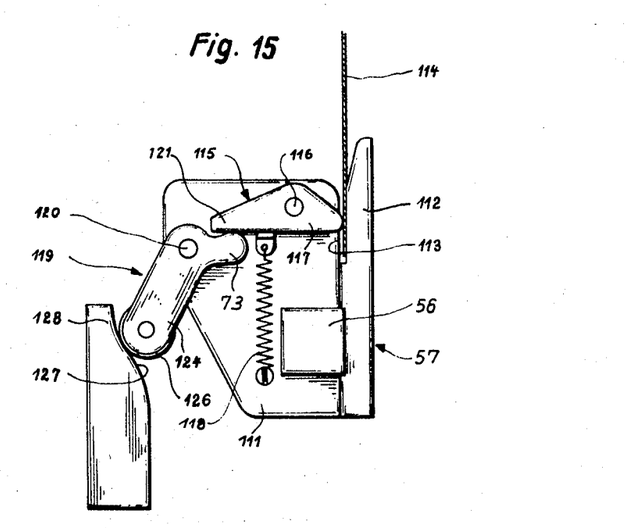
FIGURE 15 shows an elevation of a gripper with the edge of a blank inserted therein.

The gripping element 57 as illustrated in FIGURE 15 comprises a gripper body 111 and an associated gripping member 112 between which a slot 113 is provided into which the edge of a blank 114 may be inserted. A two-armed lever 115 is pivotably mounted on a pin 116 on gripping member 112 so that, after blank 114 has been inserted into slot 113, the end of the arm 117 of this lever will press the blank 114 under the action of a tension spring 118 against the gripping member 112 and thus clamp the edge of the blank in a fixed position.

A further two-armed lever 119 is likewise pivotable on the gripper body 111 about a pin 120 and its arm 122 is adapted to engage upon the arm 121 of lever 115. The other arm 124 of lever 119 carries a roller 126 which, when the gripping element 57 carrying the blank 114 reaches its lower end position engages upon the cam surface 127 of a cam member 128 and thereby pivots the two double-levers 119 and 115 about their axes 120 and 116 so that the blank 114 will be released. The supporting rod of the grippers is again indicated by FIGURE 15 by the numeral 56.

Figure 16:
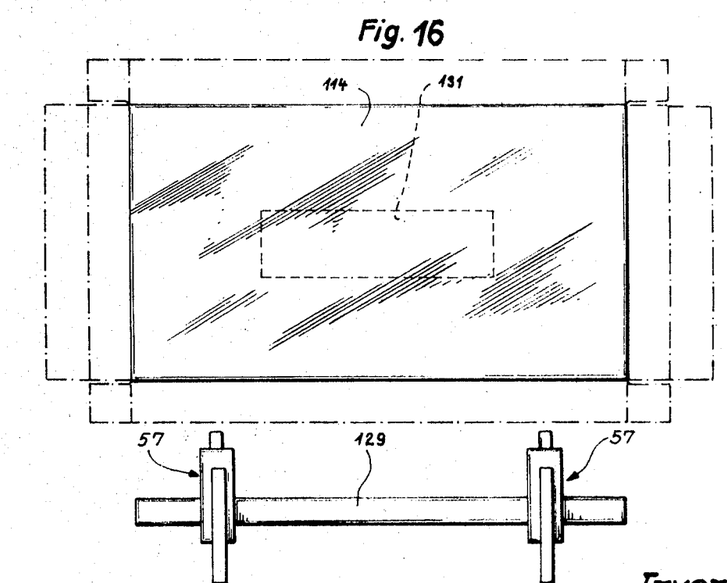
FIGURES 16 and 17, respectively, show a front view and a side view of the grippers according to FIGURE 15 holding a blank shortly prior to the time when the blank is pressed into the mold; while FIGURES 18 and 19, respectively, show a side view and a top view of a prefolding device at the opposite sides of the stacking frame containing the blanks.
Figure 17:
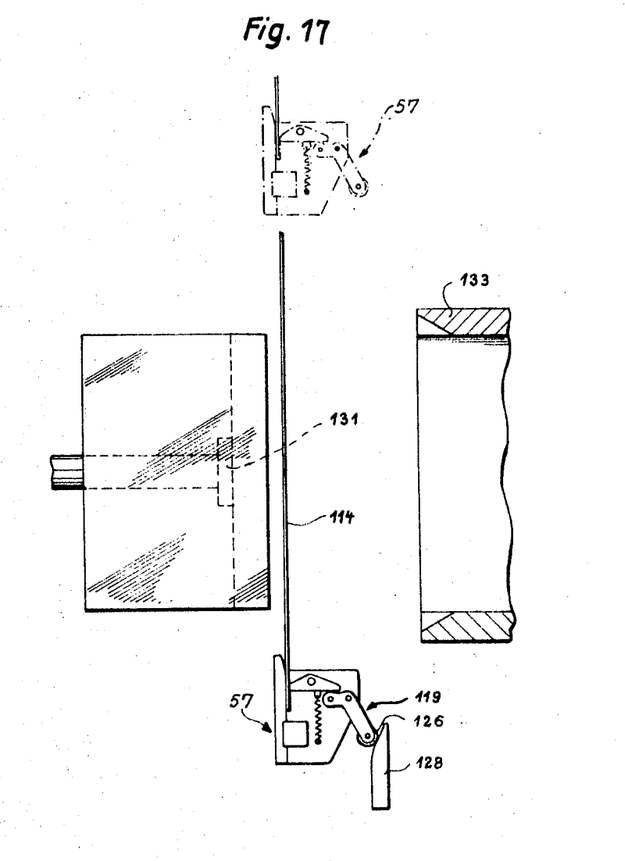

In FIGURE 16, the outline of a plunger 131 is indicated in dotted lines as being in front of the blank 114. As shown in FIGURE 17, roller 126 of the release lever 119 has already moved into engagement with the cam surface 127 of cam member 128 so that the blank 114 is about to be released from the two grippers 57 and plunger 131 will then press the blank 114 against the female mold 133. FIGURE 16a also indicates a dot-and-dash lines the grippers 57 in their upper end position.

Figure 18:
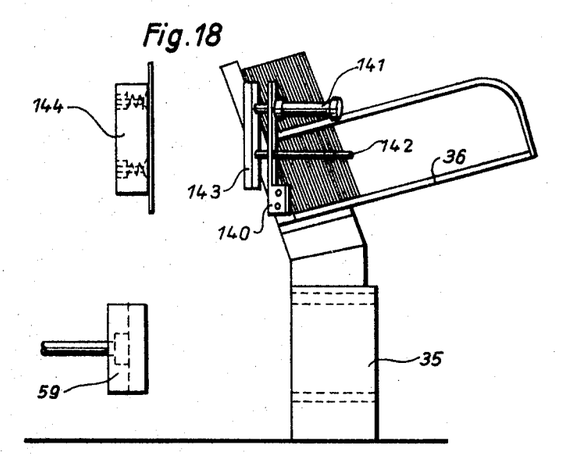
Figure 19:
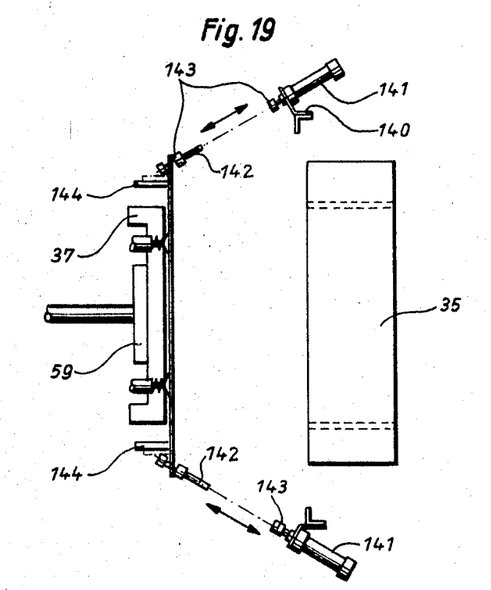

FIGURES 18 and 19 respectively show a side view and a top view of a device on each side of a frame containing a stack of blanks for guiding a prefolding member 143 which is adapted to bend the blank which is held by the gripper along the folding line 10 or 11, respectively. The blank then engages upon two fixed bending bars 144 so that the two marginal strips 12 and 13 will be bent about an angle of approximately 19°. When the two bending jaws 143 are moved back, the marginal strips 12 and 13 will snap back to their former positions so as to permit them to be coated with adhesive. This prefolding operation was found to be necessary since the flaplike arms 100 would otherwise not be able to fold the marginal strips 12 and 13 inwardly. The prefolding members 143 are guided by means of rods 142 within angle irons 140 which are secured to the machine frame. The upper rod 142 is additionally guided by a guiding tube 141.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. In a method of molding a flat precut blank so as to form a glued folded open box or box cover having a flat bottom or top, respectively, two pairs of opposite side walls connected to said bottom or top, a pair of flaps adjoining the vertical edges at each end of one of said pairs of side walls and bent at right angles thereto and extending toward each other into the plane of one of the side walls of the other pair covering said flaps, and a marginal strip adjoining the upper edge of each side wall of said other pair and folded over the upper edges of one pair of said flaps and bent inwardly so as to overlap said upper edges and connect said flap to each other, wherein before said blank is shaped to form said box or box cover by means of a plunger pressing said blank against a female mold and into a folding recess therein, said marginal strips are coated with adhesive and are bent outwardly mechanically by means of deflectors projecting laterally over said plunger, and wherein after said plunger has been retracted from said mold, said marginal strips are mechanically folded over and glued to the inwardly bent flaps by means of members pivotably mounted on said plunger.

2. A method as defined in claim 1, wherein before said blank is shaped to form said box or box cover, said other side walls carrying said marginal strips are also coated with adhesive, and wherein while said plunger is moved into said folding recess, said other side walls are held back relative to the first side walls by means of elements which are connected to said plunger.

3. A method as defined in claim 2, wherein while said blank is picked up from a stack of blanks, it is passed in a direction at right angles to and past nozzles from which the adhesive is applied in the form of worms upon the parts of the blank to be coated.

4. In an apparatus for producing a glued folded open box or box cover from a flat precut blank comprising a female mold having a folding recess therein and a plunger adapted to be moved against said mold and into said folding recess, a pair of retaining members, means for connecting said retaining members to said plunger so as to be movable at two opposite sides of said plunger to a limited extent in the direction of movement of said plunger for acting upon parts of said blank adapted to form end walls of said box or cover, and a pair of deflecting members connected to the rear part of said plunger and projecting laterally beyond said plunger.

5. An apparatus as defined in claim 4, further comprising flaplike members pivotably mounted on two opposite lateral front edges of said mold adjacent to said folding recess, and means for pivoting said members so as to fold a marginal strip on each of said end walls of said box or cover over the upper edges of a pair of flaps which are connected to and extend at right angles to the side walls of said box toward each other.

6. An apparatus as defined in claim 4, further comprising a gripping element movable at right angles to the direction of movement of said plunger and having a slot therein into which an edge portion of the blank is inserted, a gripping lever pivotably mounted on said gripping element and adapted to clamp said edge portion, and means for pivoting said gripping lever from its clamping position to a releasing position when said gripping element has been moved to a certain position.

7. An apparatus as defined in claim 6, wherein said gripping lever has a pair of arms, one of said arms being adapted to clamp said edge portion of said blank, and a fixed abutment for pivoting the second arm of said gripping lever so as to release said blank when said gripping member has moved to said position.

8. An apparatus as defined in claim 7, further comprising a release lever pivotably mounted on said gripping element and having one arm engaging upon the second arm of said gripping lever and a second arm adapted to engage upon said abutment for pivoting said gripping lever to release said blank.

9. An apparatus as defined in claim 8, wherein said abutment comprises a curved cam member, and a roller rotatably mounted on said second arm of said release lever and adapted to roll along said cam member.

10. An apparatus as defined in claim 6, further comprising a plurality of nozzles for ejecting an adhesive in a substantially horizontal direction and disposed at such a level that during the movement of said gripping element worms of adhesive will be applied upon said blank of a length substantially equal to the width of said blank.

11. An apparatus as defined in claim 10, wherein the outlet opening of each of said nozzles is spaced at a small distance from the surface of the blank to be coated with adhesive.

12. An apparatus as defined in claim 11, wherein each of said nozzles has an arcuate outer surface, the outlet opening of said nozzle being disposed below the plane in which said nozzle substantially engages with said blank so as to be spaced at a small distance therefrom.

13. An apparatus as defined in claim 12, further comprising an arcuate diaphragm pivotable relative to said nozzle about the center of curvature thereof and having at least one aperture adapted to be moved substantially in alignment with said outlet opening of said nozzle, and means for pivoting said diaphragm in accordance with the movements of said gripping element.

14. An apparatus as defined in claim 6, further comprising a feed member having suction cups for withdrawing a first blank from a stack of blanks located above said female mold and for moving the same into the plane of movement of said gripping element, and pneumatically actuated means for moving said feed member.

15. An apparatus as defined in claim 14, wherein said suction cups of said feed member are adapted to act upon a central part of said blank, and means mounted on said feed member at the opposite sides of said stack for prefolding marginal strips on the opposite ends of said blank relative to the plane of said central part of said blank.

16. An apparatus as defined in claim 4, further comprising deflecting members of a substantially triangular cross section mounted on the rear lateral ends of said plunger and adapted when said plunger is in its forward position within said mold to press against a flat surface on shaft which is preferably provided with needles and on which an L-shaped flaplike member is secured.

References Cited

UNITED STATES PATENTS

| | | | |
|---|---|---|---|
| 1,000,991 | 8/1911 | Comings | 93—54.2 |
| 2,937,578 | 5/1960 | Dorfmann | 93—51 |

BERNARD STICKNEY, Primary Examiner

U.S. Cl. X.R.

118—410